United States Patent [19]
Drake et al.

[11] Patent Number: 5,997,730
[45] Date of Patent: Dec. 7, 1999

[54] SILICONIZED ACID-TREATED ZEOLITE CONTAINING ZINC AND BORON USED AS A CATALYST FOR CONVERTING HYDROCARBONS AND METHOD OF MAKING SUCH CATALYST

[75] Inventors: Charles A. Drake, Nowata; An-hsiang Wu, Bartlesville, both of Okla.

[73] Assignee: Phillips Petroleum Company, Bartlesville, Okla.

[21] Appl. No.: 09/017,541

[22] Filed: Feb. 2, 1998

[51] Int. Cl.$^6$ .......................... C10G 35/095; B01J 29/40
[52] U.S. Cl. .................. 208/135; 502/60; 502/63; 502/64; 502/73; 502/85; 208/120.01; 208/120.25; 585/400; 585/467; 585/475
[58] Field of Search ................... 502/60, 63, 64, 502/71, 73, 77, 85; 208/120.01, 120.25, 135; 585/400, 467, 475

[56] References Cited

U.S. PATENT DOCUMENTS

| | | | |
|---|---|---|---|
| 4,049,573 | 9/1977 | Kaeding | 252/432 |
| 4,784,749 | 11/1988 | Chang et al. | 208/120 |
| 4,912,073 | 3/1990 | Chu | 502/85 |
| 5,206,004 | 4/1993 | Park | 423/700 |
| 5,476,823 | 12/1995 | Beck et al. | 502/60 |
| 5,516,736 | 5/1996 | Chang et al. | 502/64 |

*Primary Examiner*—Thomas Dunn
*Attorney, Agent, or Firm*—Charles W. Stewart

[57] ABSTRACT

A novel catalyst for the conversion of hydrocarbons comprising a material containing an acid treated zeolite, a boron component and a zinc component wherein the material is treated with a silylating agent. A method of making such novel catalyst and the use of the novel catalyst for converting paraffin hydrocarbons with a low rate of coke formation during such conversion are disclosed.

24 Claims, No Drawings

5,997,730

SILICONIZED ACID-TREATED ZEOLITE CONTAINING ZINC AND BORON USED AS A CATALYST FOR CONVERTING HYDROCARBONS AND METHOD OF MAKING SUCH CATALYST

BACKGROUND OF THE INVENTION

The invention relates to an improved process for converting non-aromatic hydrocarbons in the presence of an improved zeolite material to aromatic and lower olefin hydrocarbons with a low rate of coke formation during the conversion of such hydrocarbons in the presence of such improved zeolite material.

It is known to catalytically crack non-aromatic gasoline boiling range hydrocarbons (in particular paraffin and olefins) to lower olefins (such as ethylene and propylene) and aromatic hydrocarbons (such as benzene, toluene, and xylenes) in the presence of catalysts which contain a zeolite (such as ZSM-5), as is described in an article by N.Y. Chen et al in Industrial & Engineering Chemistry Process Design and Development, Volume 25, 1986, pages 151–155. The reaction product of this catalytic cracking process contains a multitude of hydrocarbons such as unconverted $C_5+$ alkanes, lower alkanes (methane, ethane, propane), lower alkenes (ethylene and propylene), $C_6$–$C_8$ aromatic hydrocarbons (benzene, toluene, xylenes, and ethylbenzene), and $C_9+$ aromatic hydrocarbons. Depending upon the relative market prices of the individual reaction products, it can be desirable to increase the yield of certain of the more valuable products relative to the others.

One concern with the use of zeolite catalysts in the conversion of hydrocarbons to aromatic hydrocarbons and lower olefins is the excessive production of coke during the conversion reaction. Coke formed during the zeolite catalyzed aromatization of hydrocarbons tends to cause catalyst deactivation. It is desirable to improve processes for the aromatization of hydrocarbons and the formation of lower olefins from hydrocarbons by minimizing the amount of coke formed during such processes. It is also desirable to have a zeolite catalyst that is useful in producing significant quantities of the aromatic and olefin conversion products.

SUMMARY OF THE INVENTION

It is an object of this invention to at least partially convert hydrocarbons to ethylene, propylene and BTX (benzene, toluene, xylene and ethylbenzene) aromatics.

A further object of this invention is to provide an improved process for the conversion of hydrocarbons in which the rate of coke formation during such conversion of hydrocarbons is minimized.

A yet further object of this invention is to provide an improved zeolite material which when used in the conversion of hydrocarbons results in less coke formation than certain alternative zeolite materials.

A still further object of this invention is to provide an improved zeolite material that gives an improved yield of lower olefins and BTX aromatics when utilized in the conversion of hydrocarbons.

Another object of this invention is to provide hydrocarbon conversion processes which have an acceptably low coke production rate and/or which produces a conversion product containing suitable quantities of olefins and BTX aromatics.

Another further object of this invention is to provide a method for making an improved zeolite material having such desirable properties as providing for lower coke production and favorable production of olefins and BTX aromatics when used in the conversion of hydrocarbons.

The inventive composition is a material comprising an acid leached zeolite, a boron component and a zinc component wherein such material has been treated with a silylating agent. The inventive composition may be made by incorporating a boron component and a zinc component into an acid leached zeolite and thereafter silylating the resulting material. The inventive composition may be used in the conversion of non-aromatic hydrocarbons to aromatic hydrocarbons and lower olefins by contacting under conversion conditions a hydrocarbon feedstock with the inventive composition.

Other objects and advantages of the invention will become apparent from the detailed description and the appended claims.

DETAILED DESCRIPTION OF THE INVENTION

The zeolite material used in making the inventive composition can be any zeolite that is effective in the conversion of non-aromatics to aromatics when contacted under suitable reaction conditions with non-aromatic hydrocarbons. Preferably, the zeolite has a constraint index (as defined in U.S. Pat. No. 4,097,367, which is incorporated herein by reference) in the range of about 0.4 to about 12, preferably about 2–9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is about 8:1 to about 200:1, more preferably about 12:1 to about 100:1. Preferred zeolites include ZSM-5, ZSM-8, ZSM-11, ZSM-12, ZSM-35, ZSM-38, and mixtures thereof. Some of these zeolites are also known as "MFI" or "Pentasil" zeolites. The presently more preferred zeolite is ZSM-5.

Any suitable means or method may be used to treat the zeolite starting material with acid to give an acid leached zeolite. It is preferred for the zeolite to be soaked with an acid solution by any suitable means known in the art for contacting the zeolite with such acid solution. The acid solution used to treat the zeolite can be a solution of any acid that suitably provides for the leaching of aluminum atoms from the zeolite particles. Preferably, the acid concentration in this solution is about 1–10 equivalents per liter. Examples of such suitable acids include sulfuric, phosphoric, nitric and hydrochloric. The preferred acid solution is aqueous hydrochloric acid. The zeolite is soaked in the acid solution (preferably at a temperature of about 50–100° C.) for a period upwardly to about 15 hours, but, preferably from 0.1 hour to 12 hours. After soaking, the resultant acid treated zeolite is washed free of the acid and then can be dried or calcined, or both.

The inventive composition is a material that comprises an acid treated or leached zeolite, a boron component and a zinc component with such material being siliconized by treatment with a silylating agent. The boron and zinc metals may be incorporated into the acid leached zeolite by any suitable means or method known in the art for incorporating metallic elements into a substrate material. A preferred method is the use of any standard incipient wetness technique for impregnating the acid leached zeolite substrate with the metal promoters. The preferred method uses a liquid impregnation solution containing the desirable concentrations of boron and zinc so as to ultimately provide the final inventive composition having the required concentrations of the boron and zinc components.

It is particularly desirable to use for the impregnation of the acid treated zeolite an aqueous solution containing either the zinc component or the boron component. The acid treated zeolite may be impregnated with the boron and zinc simultaneously or sequentially, or both, provided a material is formed containing an acid treated zeolite, a boron component and a zinc component. The preferred impregnation solution is an aqueous solution formed by dissolving a salt of boron and a salt of zinc in water. However, it is acceptable to use somewhat of an acidic solution to aid in the dissolution of the metal salts. It is most preferred for the acid treated zeolite to be co-impregnated with the zinc and boron components with a solution containing a salt of zinc (preferably, zinc nitrate) and a boron containing compound (preferably, boric acid).

Examples of potentially suitable boron containing compounds for incorporating into the acid treated zeolite include: boric acid, boron bromide, boron carbide, boron fluoride, boron nitride, boron oxide, carborane, N,N-dimethylanilinium tetra(pentafluorophenyl)borate, methyl oxazaborolidine, nitronium tetrafluoroborate, phenylboron dichloride, phenylboron dihydroxide, potassium dodecahydrododecaborate hydrate, potassium tri-sec-butylborohydride, sodium cyanoborohydride, tetrafluoroboric acid, tri-n-amylborate, B-triboromoborazine, tri-n-butylborate, B-trichloroborazine, triethanolamineborate, triethylborate, triethylboron, trimethyoxyboroxine, trimethylborate, trimethylboron, triphenylboron, triphenylboron sodium hydroxide, tris(pentafluorophenyl)boron, tris(trimethylsiloxy)boron, triethylammonium dodecahydrododecaborate, bis(pinacolata)diboron, and borane complexes.

Examples of potentially suitable zinc containing compounds for incorporating into the acid treated zeolite include diethylzinc, dimethylzinc, diphenylzinc, zinc acetate dehydrate, zinc acetylacetonate hydrate, zinc bromide, zinc carbonate hydroxide, zinc chloride, zinc cyclohexanebutyrate dihydrate, zinc 2-ethylhexanoate, zinc 2-ethylhexanoate, zinc fluoride, zinc fluoride tetrahydrate, zinc hexafluoroacetylacetonate dihydrate, zinc iodide, zinc molybdate, zinc naphthenate, zinc nitrate hexahydrate, zinc oxide, zinc perchlorate hexahydrate, zinc phosphate hydrate, zinc phthalocynine, zinc protoporphyrin, zinc selenide, zinc sulfate monohydrate, zinc sulfide, zinc telluride, zinc tetrafluoroborate hydrate, zinc meso-tetraphenylprophine, zinc titanate, and zinc trifluoromethanesulfonate.

The amounts of zinc and boron incorporated or impregnated into the acid treated zeolite should be such as to give concentrations effective in providing the desirable properties of favorable aromatics and olefin conversion yields with low coke production when the inventive composition is employed in the conversion of a hydrocarbon feed. Generally, the atomic ratio of the boron metal to zinc metal in the impregnated acid treated zeolite is in the range of from about 0.1:1 to about 10:1. A preferred atomic ratio of boron metal to zinc metal in the impregnated acid treated zeolite is in the range of from about 0.2:1 to about 5:1 and, most preferably, the atomic ratio is in the range of from 0.5:1 to 3:1.

The weight percent of zinc metal present in the impregnated acid treated zeolite is generally in the range upwardly to about 10 weight percent of the impregnated acid treated zeolite. The preferred concentration of zinc in the impregnated acid treated zeolite is in the range of from about 0.05 to about 8 weight percent and, most preferably, from 0.1 to 6 weight percent.

The boron metal should generally be present in the impregnated acid treated zeolite in the range upwardly to about 15 weight percent. Preferably, the concentration of boron metal in the impregnated acid treated zeolite is in the range of from about 0.1 to about 12 weight percent and, most preferably, from 0.2 to 10 weight percent.

The impregnated acid treated zeolite can be dried or calcined, or both, prior to further treatment, for example, by silylation. The drying step is generally performed in the presence of air at a temperature in the range of from about 20° C. to about 125° C. and over a time period of from about 0.1 hours to about 4 hours. The calcination temperature is generally in the range of from about 300° C. to about 700° C. The calcination can be performed in either an air atmosphere or an inert atmosphere or a combination thereof for a time period of from 0.1 hours to 10 hours.

It has been unexpectedly found that the treatment with a silylating agent of a material comprising an acid leached zeolite, a boron component, and a zinc component provides a catalyst material having improved catalytic properties. In particular, the silylated material provides a catalyst which yields a low rate of coke formation when used in the conversion of hydrocarbons in comparison to such a material that has not been treated with a silylating agent.

To form the inventive composition, a material containing an acid treated zeolite, boron and zinc is silylated by treatment with a silylating agent. The silylating agent can be any suitable silicon containing compound that effectively treats the material containing an acid treated zeolite, boron and zinc so as to provide a silylated material that is effective in giving a low rate of coke formation when used in converting gasoline to aromatics and olefins. More particularly, the silylating agent is an organosilicon compound selected from compounds having the following molecular formulas:

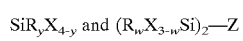

$SiR_yX_{4-y}$ and $(R_wX_{3-w}Si)_2$—Z wherein:

y=1 to 4;

w=1 to 3;

R=alkyl, aryl, H, alkoxy, arylalkyl, and where R has from 1 to 10 carbon atoms;

X=halide; and

Z=oxygen or imino or alkylimino or alkanoylimino.

The preferred silylating agent is selected from the group consisting of tetra alkyl orthosilicates, $Si(OR)_4$, and poly(alkyl)siloxane. The most preferred silylating agents are those selected from the group consisting of tetra ethyl orthosilicate and poly(phenyl methyl)siloxane.

The preferred silylating method is to impregnate the material containing acid leached zeolite, boron and zinc with a solution of the silylating agent by any standard incipient wetness technique known in the art. The solution may be an aqueous solution or a hydrocarbon solution of the silylating agent. It is preferred, however, for the silylating agent to be insoluble in water but soluble in hydrocarbon. Any suitable hydrocarbon solvent can be used including, for example, aromatics and other hydrocarbons having from 4 to 10 carbon atoms per molecule including alkanes, cycloalkanes and olefins. The most preferred hydrocarbon solvent is cyclohexane. The concentration of silylating agent in the solution can range upwardly to the solubility limit of the silylating agent in the solvent. Preferably, the concentration of the silylating agent in the solution can be in the range from about 1 weight percent to about 99 weight percent. Most preferred, the concentration of silylating agent in the solvent is from 5 to 25 weight percent.

The amount of silylating agent incorporated into the boron and zinc impregnated acid treated zeolite material should be such as to provide a silylated material that effectively provides a suitably high production of olefin and aromatics with a low rate of coke formation during its use in the conversion of gasoline to aromatics and olefins. Generally, the silylating agent can be present in the impregnated acid treated zeolite material in an amount upwardly to about 50 weight percent of such material. Preferably, the amount of silylating agent incorporated into the material can be in the range of from about 0.5 weight percent to about 40 weight percent of the material and, most preferably, from 5 weight percent to 25 weight percent of the material.

After the incorporation of silylating agent into the boron and zinc impregnated material, the thus silylated material can be dried at suitable drying conditions, generally in the presence of air, and then calcined. The drying temperature generally ranges from about 20° C. to about 125° C. and is generally preformed over a time period of from 0.1 hours to 4 hours. The calcination temperature is generally in the range of from about 300° C. to about 700° C. The calcination can be performed in an air atmosphere for a time period of from 0.1 hours to 10 hours.

The inventive composition described herein may be composited or mixed with an inorganic binder (also called matrix material) preferably selected from the group consisting of alumina, silica, alumina-silica, aluminum phosphate, clays (such as bentonite), and mixtures thereof. The composite can include the inorganic binder in an amount between 1 to 99 weight percent and, preferably from about 5 to 80 weight percent. Generally, the inventive composition and inorganic binder components are compounded and subsequently shaped (such as by pelletizing, extruding or tableting). Generally, the surface area of the compounded composition is about 50–700 m$^2$/g, and its particle size is about 1–10 mm.

Any suitable hydrocarbon feedstock which comprises paraffins (alkanes) and/or olefins (alkenes) and/or naphthenes (cycloalkanes), wherein each of these hydrocarbons contains 2–16 carbon atoms per molecule can be used as a feed to be contacted with the inventive composition under suitable process conditions for obtaining a reaction product comprising lower alkenes containing 2–5 carbon atoms per molecule and aromatic hydrocarbons. Frequently, these feedstocks also contain aromatic hydrocarbons. Non-limiting examples of suitable, available feedstocks include gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and the like. The preferred feed is a gasoline-boiling range hydrocarbon feedstock suitable for use as at least a gasoline blend stock generally having a boiling range of about 30–210° C. Generally, the content of paraffins exceeds the combined content of olefins, naphthenes and aromatics (if present).

The hydrocarbon feed stream can be contacted by any suitable manner with the inventive compositions described herein contained within a reaction zone. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst.

The contacting step is preferably carried out within a conversion reaction zone, wherein is contained the inventive composition, and under reaction conditions that suitably promote the formation of olefins, preferably light olefins, and aromatics, preferably BTX, from at least a portion of the hydrocarbons of the hydrocarbon feed. The reaction temperature of the contacting step is more particularly in the range of from about 400° C. to about 800° C., preferably, from about 450° C. to about 750° C. and, most preferably, from 500° C. to 700° C. The contacting pressure can range from subatmospheric pressure upwardly to about 500 psia, preferably, from about atmospheric to about to about 450 psia and, most preferably, from 20 psia to 400 psia.

The flow rate at which the hydrocarbon feed is charged to the conversion reaction zone is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon feed is charged to the conversion reaction zone in pounds per hour divided by the pounds of catalyst contained in the conversion reaction zone to which the hydrocarbon is charged. The preferred WHSV of the feed to the conversion reaction zone or contacting zone can be in the range of from about 0.25 hour$^{-1}$ to about 250 hour$^{-1}$ and, most preferably, from 0.5 hour$^{-1}$ to 100 hour$^{-1}$.

The following examples are presented to further illustrate this invention and are not to be construed as unduly limiting its scope.

EXAMPLE I

This example illustrates the preparation of a control and inventive catalysts tested as decided in Example II.

Acid Leached Zeolite

A commercially available ZSM-5 catalyst (provided by United Catalysts Inc., Louisville, Ky., under product designation "T-4480" was treated by acid leaching. To acid leach the catalyst, it was soaked in an aqueous HCl solution, having a concentration of 38 weight percent HCl (approximately 6N), for two hours at a constant temperature of about 90° C. After soaking, the catalyst was separated from the acid solution and thoroughly washed with water and dried. The acid soaked, washed and dried catalyst was calcined at a temperature of about 525° C. for four hours.

Catalyst A (Control)

A 10.0 gram quantity of above-described acid leached ZSM-5 catalyst was impregnated by an incipient wetness technique with an 10 gram quantity of a solution containing 5.4 parts by weight hydrated zinc nitrate (Zn(NO$_3$)$_2$·6H$_2$O), 2.25 parts by weight boric acid (H$_3$BO$_3$) and 42.35 parts by weight water. The impregnation solution had an atomic ratio of boron to zinc of 2.0. This impregnated, acid leached zeolite was then dried in air at a temperature of 125° C. for 16 hours followed by treatment in a steam atmosphere for 6 hours at 650° C. The steam treated material was then exposed to a helium gas atmosphere at a temperature of 538° C. for 2 hours. The final product contained 2.314 weight percent zinc and 0.767 weight percent boron.

Catalyst B (Invention)

A 10.00 gram quantity of the above described acid leached zeolite material was impregnated with 0.54 grams hydrated zinc nitrate (Zn(NO$_3$)$_2$·6H$_2$O) and 9 grams boric acid (H$_3$BO$_3$). The impregnation solution had an atomic ratio of boron to zinc of 4. This impregnated, acid leached zeolite was then treated with steam for 6 hours at 650° C. to give a material containing 1.18 weight percent zinc and 0.782 weight percent boron. A 5.17 gram quantity of the boron and zinc containing acid leached zeolite material was treated with a silylating agent by impregnating it with 3.36 grams of a solution of 50 weight percent poly(methylphenyl siloxane) in cyclohexane. The resultant silylated material was calcined at 538° C. for 6 hours.

EXAMPLE II

This example illustrates the use of the zeolite materials described in Example I as catalysts in the conversion of a gasoline feed to benzene, toluene and xylenes (BTX) and lower olefins (ethylene, propylene).

For each of the test runs, a 5.0 g sample of the catalyst materials described in Example I was placed into a stainless steel tube reactor (length: about 18 inches; inner diameter: about 0.5 inch). Gasoline boiling range feedstock from a catalytic cracking unit of a refinery was passed through the reactor at a flow rate of about 14 ml/hour, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Results of two test runs for Catalysts A and B are summarized in Table 1. All test data were obtained after 8 hours on stream.

TABLE I

| Catalyst | BTX Yield | Light Olefin Yield* | Sum of BTX and olefin | Percent Coke |
|---|---|---|---|---|
| A (Control) | 39 | 20.7 | 59.7 | 0.3 |
| B (Invention) | 37 | 20.7 | 57.7 | 0.07 |

*Ethylene + Propylene

The test data presented in Table I show that the inventive Catalyst B exhibited considerably less coking (which results in excessive catalyst deactivation) than control Catalyst A and similar BTX and olefin yield. The improvement in catalyst performance is believed to be due to the silylating treatment of the material comprising an acid treated zeolite, boron, and zinc.

Reasonable variations, modifications, and adaptations can be made within the scope of the disclosure and the appended claims without departing from the scope of this invention.

That which is claimed is:

1. A composition for use in converting hydrocarbons, said composition comprises:

a material treated with a silylating agent wherein said material comprises an acid leached zeolite, a boron component, and a zinc component.

2. A comprising as recited in claim 1 wherein said material is prepared by impregnating said acid leached zeolite with said boron component and with said zinc component.

3. A composition as recited in claim 2 wherein the atomic ratio of boron to zinc in said material is in the range of from about 0.1:1 to about 10:1.

4. A composition as recited in claim 3 wherein the treatment of said material with said silylating agent is such as to provide a concentration of upwardly to about 50 weight percent of said silylating agent in said material.

5. A composition as recited in claim 4 wherein the impregnation of said acid leached zeolite with said boron compound and said zinc component includes adding to said acid leached zeolite a liquid solution containing a salt of zinc and a boron containing compound.

6. A composition as recited in claim 5 wherein the impregnation of said acid leached zeolite with said boron component and said zinc component includes adding to said acid leached zeolite a liquid solution containing zinc nitrate and boric acid.

7. A composition as recited in claim 6 wherein said silylating agent is an organosilicon compound selected from compounds having the formulas:

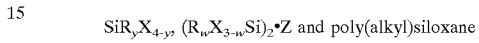

wherein:

y=1 to 4;

w=1 to 3;

R=alkyl, aryl, H, alkoxy, arylalkyl, and where R has from 1 to 10 carbon atoms;

X=halide; and

Z=oxygen or imino or alkylimino or alkanoylimino.

8. A composition as recited in claim 7 wherein the treatment of said material with said silylating agent includes adding to said material a solution containing said silylating agent selected from the group consisting of tetra alkyl orthosilicates, $Si(OR)_4$, and poly(alkyl)siloxane.

9. A composition as recited in claim 8 wherein the zeolite of said acid leached zeolite is selected from the group consisting of ZSM-5, ZSM-8, ZSM-11, ZSM-12, ZSM-35, ZSM-38, and mixtures thereof.

10. A composition as recited in claim 9 wherein the zeolite of said acid leached zeolite is ZSM-5.

11. A composition as recited in claim 10 wherein said acid leached zeolite is prepared by contacting a zeolite starting material with an acid selected from the group consisting of sulfuric, phosphoric, nitric, and hydrochloric.

12. A method of making a high stability catalyst composition, said method comprises:

incorporating a boron component and a zinc component into an acid leached zeolite to form an impregnated acid leached zeolite material; and thereafter, treating said impregnated acid leached zeolite material with a silylating agent to thereby form said high stability catalyst composition.

13. A method as recited in claim 12 wherein the amount of said boron component and said zinc component incorporated into said acid leached zeolite is such as to provide an atomic ratio of boron to zinc in said high stability catalyst composition in the range of from about 0.1:1 to about 10:1.

14. A method as recited in claim 13 wherein the treatment of said impregnated acid leached zeolite with said silylating agent is such as to provide a concentration of upwardly to about 50 weight percent of said impregnated acid leached zeolite.

15. A method as recited in claim 14 wherein said boron component and said zinc component are incorporated into said acid leached zeolite by adding to said acid leached zeolite a liquid solution containing a salt of zinc and a boron containing compound.

16. A method as recited in claim 15 wherein said liquid solution is an aqueous solution of zinc nitrate and boric acid.

17. A method as recited in claim 16 wherein said silylating agent is an organosilicon compound selected from compounds having the formulas:

$SiR_yX_{4-y}$, $(R_wX_{3-w}Si)_2 \cdot Z$ and poly(alkyl)siloxane wherein:
y=1 to 4;
w=1 to 3;
R=alkyl, aryl, H, alkoxy, arylalkyl, and where R has from 1 to 10 carbon atoms;
X=halide; and
Z=oxygen or imino or alkylimino or alkanoylimino.

18. A method as recited in claim 17 wherein the treatment of said impregnated acid leached zeolite is with a solution containing said silylating agent selected from the group consisting of tetra alkyl orthosilicates, $Si(OR)_4$, and poly(alkyl)siloxane.

19. A method as recited in claim 18 wherein the zeolite of said acid leached zeolite is selected from the group consisting of ZSM-5, ZSM-8, ZSM-11, ZSM-12, ZSM-35, ZSM-38, and mixtures thereof.

20. A method as recited in claim 19 wherein the zeolite of said acid leached zeolite is ZSM-5.

21. A method as recited in claim 20 wherein said acid leached zeolite is prepared by contacting a zeolite starting material with an acid selected from the group consisting of sulfuric, phosphoric, nitric, and hydrodibonic.

22. A composition prepared by the method of claims 12, 13, 14, 15, 16, 17, 18, 19, 20, or 21.

23. A process comprising contacting under conversion conditions a hydrocarbon feed with the composition of claims 1, 2, 3, 4, 5, 6, 7, 8, 9, 10, or 11 wherein a conversion product includes aromatics and olefins.

24. A process comprising contacting under conversion conditions a hydrocarbon feed with the composition prepared by the method of claims 12, 13, 14, 15, 16, 17, 18, 19, 20 or 21 wherein a conversion product includes aromatics and olefins.

* * * * *